(12) United States Patent
Reeves

(10) Patent No.: US 8,761,831 B2
(45) Date of Patent: Jun. 24, 2014

(54) MIRRORED REMOTE PERIPHERAL INTERFACE

(75) Inventor: Paul E. Reeves, Oakville (CA)

(73) Assignee: Z124, George Town (KY)

( * ) Notice: Subject to any disclaimer, the term of this patent is extended or adjusted under 35 U.S.C. 154(b) by 0 days.

(21) Appl. No.: 12/905,920

(22) Filed: Oct. 15, 2010

(65) Prior Publication Data

US 2012/0094716 A1    Apr. 19, 2012

(51) Int. Cl.
*H04B 1/38* (2006.01)
*G06K 15/00* (2006.01)
*G09G 5/00* (2006.01)

(52) U.S. Cl.
USPC ........................ 455/557; 358/1.12; 345/679

(58) Field of Classification Search
USPC ............. 455/557, 550.1, 552.1, 554.2, 556.1, 455/3.06, 41.1–41.3; 702/150–153, 68, 702/94–95, 104, 116, 155, 188; 709/224, 709/203, 219; 345/3.06, 30, 48, 107, 156, 345/158, 679, 659, 656, 653, 649; 358/1.11–1.15
See application file for complete search history.

(56) References Cited

U.S. PATENT DOCUMENTS

| | | |
|---|---|---|
| 5,396,630 A | 3/1995 | Banda et al. |
| 5,673,403 A | 9/1997 | Brown et al. |
| 5,764,984 A | 6/1998 | Loucks |
| 5,874,928 A | 2/1999 | Kou |
| 6,108,715 A | 8/2000 | Leach et al. |
| 6,157,959 A | 12/2000 | Bonham et al. |
| 6,178,503 B1 | 1/2001 | Madden et al. |
| 6,182,158 B1 | 1/2001 | Kougiouris et al. |
| 6,260,075 B1 | 7/2001 | Cabrero et al. |
| 6,477,585 B1 | 11/2002 | Cohen et al. |
| 6,486,890 B1 | 11/2002 | Harada et al. |
| 6,507,336 B1 | 1/2003 | Lunsford |
| 6,694,368 B1 | 2/2004 | An et al. |
| 6,826,703 B2 | 11/2004 | Kawano et al. |
| 6,917,963 B1 | 7/2005 | Hipp et al. |
| 6,927,908 B2 | 8/2005 | Stark |

(Continued)

FOREIGN PATENT DOCUMENTS

| | | |
|---|---|---|
| JP | 7219903 | 8/1995 |
| JP | 08115144 | 5/1996 |

(Continued)

OTHER PUBLICATIONS

Google Image Result Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg.

(Continued)

*Primary Examiner* — Andrew Wendell
*Assistant Examiner* — Cindy Trandai
(74) *Attorney, Agent, or Firm* — Sheridan Ross P.C.

(57) ABSTRACT

A mobile telecommunication/computing device that can print to a printer, the device having a sensor therein that determines the physical orientation of the device and the device displaying documents on a display in accordance with the orientation of the device. The device sends information to a printer that directs the printer to print the document in the orientation that the document is displayed on the device. The display orientation and print orientation may be portrait or landscape. Similar methods can be used to control other printer variables or, more generally, variables on other peripheral devices.

12 Claims, 3 Drawing Sheets

(56) References Cited

U.S. PATENT DOCUMENTS

| | | |
|---|---|---|
| 6,961,941 B1 | 11/2005 | Nelson et al. |
| 6,970,173 B2 | 11/2005 | Ciolac |
| 7,069,519 B1 | 6/2006 | Okude et al. |
| 7,127,723 B2 | 10/2006 | Endo et al. |
| 7,284,203 B1 | 10/2007 | Meeks et al. |
| 7,453,465 B2 | 11/2008 | Schmieder et al. |
| 7,478,341 B2 | 1/2009 | Dove |
| 7,489,503 B2 | 2/2009 | Maatta |
| 7,565,535 B2 | 7/2009 | Roberts et al. |
| 7,681,134 B1 | 3/2010 | Grechishkin et al. |
| 7,705,799 B2 | 4/2010 | Niwa |
| 7,880,728 B2 | 2/2011 | de los Reyes et al. |
| 7,949,633 B1 | 5/2011 | Shaver et al. |
| 7,950,008 B2 | 5/2011 | Bhide et al. |
| 7,960,945 B1 | 6/2011 | Onorato et al. |
| 8,397,245 B2 | 3/2013 | Filali-Adib et al. |
| 2002/0010844 A1 | 1/2002 | Noel et al. |
| 2002/0157001 A1 | 10/2002 | Huang et al. |
| 2002/0158811 A1 | 10/2002 | Davis |
| 2003/0001848 A1 | 1/2003 | Doyle et al. |
| 2003/0020954 A1 | 1/2003 | Udom et al. |
| 2003/0079010 A1 | 4/2003 | Osborn |
| 2003/0079205 A1 | 4/2003 | Miyao et al. |
| 2003/0115443 A1 | 6/2003 | Cepulis et al. |
| 2003/0131143 A1 | 7/2003 | Myers |
| 2003/0174172 A1 | 9/2003 | Conrad et al. |
| 2003/0177285 A1 | 9/2003 | Hunt et al. |
| 2003/0179541 A1 | 9/2003 | Sullivan |
| 2003/0226116 A1 | 12/2003 | Kuwata et al. |
| 2004/0137855 A1 | 7/2004 | Wiley et al. |
| 2004/0141085 A1* | 7/2004 | Nickel et al. ............ 348/333.11 |
| 2004/0226023 A1 | 11/2004 | Tucker |
| 2005/0083642 A1 | 4/2005 | Senpuku et al. |
| 2005/0193267 A1 | 9/2005 | Liu et al. |
| 2005/0237587 A1* | 10/2005 | Nakamura ................... 358/527 |
| 2005/0246505 A1 | 11/2005 | McKenney et al. |
| 2005/0248501 A1 | 11/2005 | Kim |
| 2006/0010314 A1 | 1/2006 | Xu |
| 2006/0031572 A1 | 2/2006 | Feuerstein et al. |
| 2006/0107020 A1 | 5/2006 | Stillwell, Jr. et al. |
| 2006/0136828 A1 | 6/2006 | Asano |
| 2006/0183505 A1 | 8/2006 | Willrich |
| 2006/0187142 A1 | 8/2006 | Lesniak |
| 2006/0227806 A1 | 10/2006 | Tseng |
| 2006/0248404 A1 | 11/2006 | Lindsay et al. |
| 2007/0005661 A1 | 1/2007 | Yang |
| 2007/0014295 A1 | 1/2007 | Fernandes et al. |
| 2007/0022155 A1 | 1/2007 | Owens et al. |
| 2007/0033260 A1 | 2/2007 | Grouzdev et al. |
| 2007/0067769 A1 | 3/2007 | Geisinger |
| 2007/0111750 A1* | 5/2007 | Stohr et al. ................. 455/550.1 |
| 2007/0136356 A1 | 6/2007 | Smith et al. |
| 2007/0182663 A1 | 8/2007 | Biech |
| 2007/0198760 A1 | 8/2007 | Han |
| 2007/0271522 A1 | 11/2007 | Son et al. |
| 2007/0288941 A1 | 12/2007 | Dunshea et al. |
| 2008/0024388 A1 | 1/2008 | Bruce |
| 2008/0057910 A1 | 3/2008 | Thoresson et al. |
| 2008/0062625 A1 | 3/2008 | Batio |
| 2008/0082815 A1 | 4/2008 | Kawano et al. |
| 2008/0090525 A1 | 4/2008 | Joo |
| 2008/0119237 A1 | 5/2008 | Kim |
| 2008/0119731 A1 | 5/2008 | Becerra et al. |
| 2008/0134061 A1 | 6/2008 | Banerjee et al. |
| 2008/0155103 A1 | 6/2008 | Bailey |
| 2008/0244599 A1 | 10/2008 | Hodson et al. |
| 2008/0291283 A1* | 11/2008 | Achiwa et al. ............ 348/207.2 |
| 2008/0299951 A1 | 12/2008 | Karkanias et al. |
| 2009/0037649 A1 | 2/2009 | Xu |
| 2009/0055749 A1 | 2/2009 | Chatterjee et al. |
| 2009/0083829 A1 | 3/2009 | Peterson |
| 2009/0089569 A1 | 4/2009 | Baribault et al. |
| 2009/0100429 A1 | 4/2009 | Thoelke et al. |
| 2009/0109468 A1* | 4/2009 | Barclay et al. ............ 358/1.15 |
| 2009/0119580 A1 | 5/2009 | Rohrabaugh et al. |
| 2009/0138818 A1 | 5/2009 | Nemoto |
| 2009/0158299 A1 | 6/2009 | Carter |
| 2009/0164930 A1 | 6/2009 | Chen et al. |
| 2009/0217071 A1 | 8/2009 | Huang et al. |
| 2009/0219254 A1 | 9/2009 | Lai et al. |
| 2009/0249247 A1 | 10/2009 | Tseng et al. |
| 2009/0249331 A1 | 10/2009 | Davis et al. |
| 2009/0256780 A1 | 10/2009 | Small et al. |
| 2009/0257657 A1 | 10/2009 | Temmermans et al. |
| 2009/0278806 A1 | 11/2009 | Duarte et al. |
| 2009/0305743 A1* | 12/2009 | Gouesbet et al. ............ 455/566 |
| 2009/0313440 A1 | 12/2009 | Kim et al. |
| 2009/0327560 A1 | 12/2009 | Yalovsky |
| 2010/0005396 A1 | 1/2010 | Nason et al. |
| 2010/0013863 A1* | 1/2010 | Harris ........................... 345/679 |
| 2010/0046026 A1 | 2/2010 | Heo |
| 2010/0049775 A1 | 2/2010 | Rajawat |
| 2010/0060549 A1 | 3/2010 | Tsern |
| 2010/0063994 A1 | 3/2010 | Cook et al. |
| 2010/0064228 A1 | 3/2010 | Tsern |
| 2010/0064244 A1 | 3/2010 | Kilpatrick et al. |
| 2010/0064536 A1 | 3/2010 | Caskey et al. |
| 2010/0066763 A1* | 3/2010 | Macdougall et al. ......... 345/656 |
| 2010/0079355 A1 | 4/2010 | Kilpatrick, II et al. |
| 2010/0085274 A1 | 4/2010 | Kilpatrick et al. |
| 2010/0085301 A1* | 4/2010 | Cohen et al. .................. 345/156 |
| 2010/0085382 A1 | 4/2010 | Lundqvist et al. |
| 2010/0097386 A1 | 4/2010 | Kim et al. |
| 2010/0107163 A1 | 4/2010 | Lee |
| 2010/0122271 A1 | 5/2010 | Labour et al. |
| 2010/0149121 A1 | 6/2010 | Alexander et al. |
| 2010/0157518 A1 | 6/2010 | Ladouceur et al. |
| 2010/0177019 A1 | 7/2010 | Jeong et al. |
| 2010/0177047 A1 | 7/2010 | Brenneman et al. |
| 2010/0211769 A1 | 8/2010 | Shankar et al. |
| 2010/0246119 A1 | 9/2010 | Collopy et al. |
| 2010/0250975 A1 | 9/2010 | Gill et al. |
| 2010/0251233 A1 | 9/2010 | Majewski et al. |
| 2010/0319008 A1 | 12/2010 | Ho |
| 2010/0321275 A1 | 12/2010 | Hinckley et al. |
| 2011/0016299 A1 | 1/2011 | Galicia et al. |
| 2011/0016301 A1 | 1/2011 | Galicia et al. |
| 2011/0025625 A1 | 2/2011 | Hirako |
| 2011/0034214 A1 | 2/2011 | Hong et al. |
| 2011/0063192 A1 | 3/2011 | Miller et al. |
| 2011/0093691 A1 | 4/2011 | Galicia et al. |
| 2011/0093836 A1 | 4/2011 | Galicia et al. |
| 2011/0102314 A1 | 5/2011 | Roux |
| 2011/0113329 A1 | 5/2011 | Pusateri |
| 2011/0115737 A1 | 5/2011 | Fuyuno et al. |
| 2011/0126216 A1 | 5/2011 | Galicia et al. |
| 2011/0167492 A1 | 7/2011 | Ghosh et al. |
| 2011/0209102 A1 | 8/2011 | Hinckley et al. |
| 2011/0210922 A1 | 9/2011 | Griffin |
| 2011/0216064 A1 | 9/2011 | Dahl et al. |
| 2011/0225538 A1 | 9/2011 | Oyagi et al. |
| 2011/0239142 A1 | 9/2011 | Steeves et al. |
| 2011/0246904 A1 | 10/2011 | Pinto et al. |
| 2011/0260997 A1 | 10/2011 | Ozaki |
| 2011/0267478 A1 | 11/2011 | Jacobs |
| 2011/0273464 A1 | 11/2011 | Brunner et al. |
| 2011/0273475 A1* | 11/2011 | Herz et al. .................... 345/659 |
| 2011/0289444 A1 | 11/2011 | Winsky |
| 2011/0291964 A1 | 12/2011 | Chambers et al. |
| 2012/0005602 A1 | 1/2012 | Anttila et al. |
| 2012/0005691 A1 | 1/2012 | Wong et al. |
| 2012/0026069 A1 | 2/2012 | Ohsaki |
| 2012/0060089 A1 | 3/2012 | Heo et al. |
| 2012/0081278 A1 | 4/2012 | Freedman |
| 2012/0081353 A1 | 4/2012 | Yusupov et al. |
| 2012/0081354 A1 | 4/2012 | Yusupov et al. |
| 2012/0081380 A1 | 4/2012 | Reeves et al. |
| 2012/0081383 A1 | 4/2012 | Reeves et al. |
| 2012/0081396 A1 | 4/2012 | Yusupov et al. |
| 2012/0084480 A1 | 4/2012 | Reeves et al. |
| 2012/0084481 A1 | 4/2012 | Reeves et al. |
| 2012/0084542 A1 | 4/2012 | Reeves et al. |
| 2012/0084675 A1 | 4/2012 | Sirpal et al. |
| 2012/0084697 A1 | 4/2012 | Reeves |

(56) References Cited

U.S. PATENT DOCUMENTS

| | | |
|---|---|---|
| 2012/0084791 A1 | 4/2012 | Benedek et al. |
| 2012/0084792 A1 | 4/2012 | Benedek et al. |
| 2012/0084793 A1 | 4/2012 | Reeves et al. |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089906 A1 | 4/2012 | Reeves et al. |
| 2012/0089992 A1 | 4/2012 | Reeves et al. |
| 2012/0172088 A1 | 7/2012 | Kirch et al. |
| 2012/0176413 A1 | 7/2012 | Kulik et al. |
| 2012/0188185 A1 | 7/2012 | Cassar |
| 2012/0278747 A1 | 11/2012 | Abraham et al. |
| 2012/0278750 A1 | 11/2012 | Abraham et al. |
| 2013/0019183 A1 | 1/2013 | Reeves et al. |
| 2013/0021262 A1 | 1/2013 | Chen |
| 2013/0024778 A1 | 1/2013 | Reeves et al. |
| 2013/0024812 A1 | 1/2013 | Reeves et al. |
| 2013/0076672 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076683 A1 | 3/2013 | Reeves |
| 2013/0079062 A1 | 3/2013 | Sirpal et al. |
| 2013/0080945 A1 | 3/2013 | Reeves |
| 2013/0088411 A1 | 4/2013 | Reeves et al. |
| 2013/0167159 A1 | 6/2013 | Ricci et al. |

FOREIGN PATENT DOCUMENTS

| | | |
|---|---|---|
| JP | 2008225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |

OTHER PUBLICATIONS

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from:www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/DualScree. . . .

Website entitled "Lapdock™ for Motorola ATRIX," Motorola Mobility, Inc, 2011, [retrieved on Apr. 18, 2011], 1 page. Retrieved from: www.motorola.com/Consumers/US-EN/Consumer-Product-and-Services/Mobile. . . .

Website entitled "Motorola ATRIX 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review_id2667.

Burns, C., "Motorola ATRIX 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Stein, S., "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938_105-20031251-1.html.

Sud, et al., "Dynamic Migration of Computation Through Virtualization of the Mobile Platform," Mobile Networks and Applications, 2012, (published online Feb. 22, 2011), vol. 17, Iss. 2, pp. 206-215.

Website entitled, "Kyocera Echo," Kyocera Communications, Inc., 2011, [retrieved on Aug. 27, 2012], 6 pages. Retrieved from: www.echobykyocera.com/.

Website entitled, "Sony Tablet," Sony Corporation, 2012, [retrieved on Aug. 27, 2012], 3 pages. Retrieved from: www.store.sony.com/webapp/wcs/stores/servlet/CategoryDisplay?catalogId=10551&storeId=101 51&langId=-1&categoryId=8198552921644795521.

International Search Report for International Patent Application No. PCT/US2011/056149, mailed Apr. 24, 2012, 5 pages.

Written Opinion for International Patent Application No. PCT/US2011/056149, mailed Apr. 24, 2012, 4 pages.

International Search Report for International Patent Application No. PCT/US2011/053130, mailed Apr. 24, 2012, 5 pages.

Written Opinion for International Patent Application No. PCT/US2011/053130, mailed Apr. 24, 2012, 4 pages.

International Search Report for International Patent Application No. PCT/US2011/053826, mailed Apr. 27, 2012, 5 pages.

Written Opinion for International Patent Application No. PCT/US2011/053826, mailed Apr. 27, 2012, 4 pages.

International Search Report for International Patent Application No. PCT/US2011/052988, mailed May 3, 2012, 5 pages.

Written Opinion for International Patent Application No. PCT/US2011/052988, mailed May 3, 2012, 4 pages.

International Search Report for International Patent Application No. PCT/US2011/054605, mailed Apr. 30, 2012, 5 pages.

Written Opinion for International Patent Application No. PCT/US2011/054605, mailed Apr. 30, 2012, 5 pages.

International Search Report for International Patent Application No. PCT/US2011/053909, mailed Apr. 30, 2012, 5 pages.

Written Opinion for International Patent Application No. PCT/US2011/053909, mailed Apr. 30, 2012, 4 pages.

International Search Report for International Patent Application No. PCT/US2011/054623, mailed Apr. 27, 2012, 5 pages.

Written Opinion for International Patent Application No. PCT/US2011/054623, mailed Apr. 27, 2012, 4 pages.

International Search Report for International Patent Application No. PCT/US2011/053037, mailed Mar. 20, 2012, 5 pages.

Written Opinion for International Patent Application No. PCT/US2011/053037, mailed Mar. 20, 2012, 6 pages.

International Search Report for International Patent Application No. PCT/US2011/053923, mailed Apr. 30, 2012, 5 pages.

Written Opinion for International Patent Application No. PCT/US2011/053923, mailed Apr. 30, 2012, 4 pages.

International Search Report for International Patent Application No. PCT/US2011/054017, mailed Apr. 24, 2012, 5 pages.

Written Opinion for International Patent Application No. PCT/US2011/054017, mailed Apr. 24, 2012, 4 pages.

International Search Report for International Patent Application No. PCT/US2011/053665, mailed Apr. 30, 2012, 5 pages.

Written Opinion for International Patent Application No. PCT/US2011/053665, mailed Apr. 30, 2012, 4 pages.

International Search Report for International Patent Application No. PCT/US2011/053691, mailed May 4, 2012, 5 pages.

(56) References Cited

OTHER PUBLICATIONS

Written Opinion for International Patent Application No. PCT/US2011/053691, mailed May 4, 2012, 4 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Search Report for International Patent Application No. PCT/US2011/053127, mailed Apr. 24, 2012, 5 pages.
Written Opinion for International Patent Application No. PCT/US2011/053127, mailed Apr. 24, 2012, 4 pages.
Official Action for U.S. Appl. No. 13/251,427 mailed Feb. 15, 2013, 18 pages.
Official Action for U.S. Appl. No. 13/246,669 mailed Jan. 8, 2013, 14 pages.
U.S. Appl. No. 13/843,086, filed Mar. 15, 2013, Reeves et al.
U.S. Appl. No. 13/485,734, filed May 31, 2012, Reeves et al.
Google Transliteration IME website, 2010, available at www.google.com/ime/transliteration/help.html#features, 8 pages.
InputKing Online Input System, 2011, available at www.inputking.com, 2 pages.
Dutko, "Domo Arigato Mr Androidato—An Introduction to the New Google Mobile Linux Framework, Android," Linux Journal, Mar. 2008, vol. 2008, Iss. 167, 9 pages.
Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.
Sakhr Software—Arabic Optical Character Recognition, Jul. 15, 2011, available at www.sakhr.com/ocr.aspx, 1 page.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report and Written Opinion for International Patent Application No. PCT/US2012/046800, mailed Feb. 20, 2013, 9 pages.
International Search Report and Written Opinion for International Patent Application No. PCT/US2012/046802, mailed Feb. 20, 2013, 9 pages.
International Preliminary Report on Patentability for International Patent Application No. PCT/US2011/056149, mailed Apr. 25, 2013, 6 pages.
International Search Report for International Patent Application No. PCT/US11/52822, mailed Apr. 27, 2012, 5 pages.
International Preliminary Report on Patentability for International (PCT) Patent Application No. PCT/US2011/052822, mailed Apr. 11, 2013 7 pages.
International Search Report for International Patent Application No. PCT/US11/52598, mailed Mar. 27, 2012, 3 pages.
International Preliminary Report on Patentability for International (PCT) Patent Application No. PCT/US2011/052598, mailed Apr. 11, 2013 9 pages.
International Search Report for International Patent Application No. PCT/US11/53835, mailed Apr. 30, 2012, 5 pages.
Written Opinion for International Patent Application No. PCT/US11/53835, mailed Apr. 30, 2012, 4 pages.
International Preliminary Report on Patentability for International (PCT) Patent Application No. PCT/US2011/053835, mailed Apr. 11, 2013 6 pages.
International Preliminary Report on Patentability for International Patent Application No. PCT/US2011/053130, mailed Apr. 11, 2013, 6 pages.
International Preliminary Report on Patentability for International Patent Application No. PCT/US2011/053826, mailed Apr. 11, 2013, 6 pages.
International Preliminary Report on Patentability for International Patent Application No. PCT/US2011/052988, mailed Apr. 11, 2013, 6 pages.
International Preliminary Report on Patentability for International Patent Application No. PCT/US2011/054605, mailed Apr. 11, 2013, 7 pages.
International Preliminary Report on Patentability for International Patent Application No. PCT/US2011/053909, mailed Apr. 11, 2013, 6 pages.
International Preliminary Report on Patentability for International Patent Application No. PCT/US2011/054623, mailed Apr. 11, 2013, 6 pages.
International Preliminary Report on Patentability for International Patent Application No. PCT/US2011/053037, mailed Apr. 11, 2013, 8 pages.
International Preliminary Report on Patentability for International Patent Application No. PCT/US2011/053923, mailed Apr. 11, 2013, 6 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013 6 pages.
International Preliminary Report on Patentability for International Patent Application No. PCT/US2011/053665, mailed Apr. 11, 2013, 6 pages.
International Preliminary Report on Patentability for International Patent Application No. PCT/US2011/053691, mailed Apr. 11, 2013, 6 pages.
International Preliminary Report on Patentability for International Patent Application No. PCT/US2011/054019, mailed Apr. 11, 2013, 6 pages.
International Preliminary Report on Patentability for International Patent Application No. PCT/US2011/053127, mailed Apr. 11, 2013, 6 pages.
Official Action for U.S. Appl. No. 13/247,719, mailed Mar. 19, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/399,901, mailed Aug. 2, 2013 17 pages.
Official Action for U.S. Appl. No. 12/948,686, mailed Jul. 26, 2013 11 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 13/246,665, mailed Apr. 24, 2013 30 pages.

(56) References Cited

OTHER PUBLICATIONS

Official Action for U.S. Appl. No. 246,665, mailed Aug. 28, 2013 33 pages.
Official Action for U.S. Appl. No. 13/217,099 mailed Apr. 10, 2013, 53 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Official Action for U.S. Appl. No. 13/217,130 mailed Mar. 15, 2013, 12 pages.
Official Action for U.S. Appl. No. 13/247,170 mailed Apr. 11, 2013, 36 pages.
Official Action for U.S. Appl. No. 13/247,170, mailed Aug. 5, 2013 34 pages.
Official Action for U.S. Appl. No. 13/246,699, mailed Jul. 12, 2013 18 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,675 mailed May 1, 2013, 27 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
U.S. Appl. No. 14/068,862, filed Oct. 31, 2013, Benedek.
International Search Report for International (PCT) Patent Application No. PCT/US2012/046798, mailed Feb. 20, 2013 3 pages.
International Preliminary Report on Patentability for International (PCT) Patent Application No. PCT/US2012/046798, mailed Jan. 23, 2014 6 pages.
International Preliminary Report on Patentability for International (PCT) Patent Application No. PCT/US2012/046800, mailed Jan. 23, 2014 6 pages.
Extended Search Report for European Patent Application No. 11829766.2, dated Jan. 8, 2014 11 pages.
Official Action for U.S. Appl. No. 13/484,951, mailed Jan. 30, 2014 12 pages.
Final Action for U.S. Appl. No. 13/399,901, mailed Dec. 26, 2013 20 pages.
Official Action for U.S. Appl. No. 12/948,686, mailed Jan. 29, 2014 13 pages.
Notice of Allowance for U.S. Appl. No. 13/247,885, mailed Jan. 9, 2014 8 pages.
Official Action for U.S. Appl. No. 13/250,764, mailed Dec. 11, 2013 23 pages.
Official Action for U.S. Appl. No. 13/247,170, mailed Dec. 11, 2013 47 pages.
Official Action for U.S. Appl. No. 13/246,128, mailed Dec. 26, 2013 43 pages.
Official Action for U.S. Appl. No. 13/246,133, mailed Jan. 15, 2014 37 pages.
Official Action for U.S. Appl. No. 13/217,121, mailed Feb. 10, 2014 12 pages.
"Apple iPod and iPhone dock Connector Pinout," AllPinouts, Sep. 27, 2010, 3 pages [www.allpinouts.org/index/php/Apple_iPod,_iPad_and_iPhone_dock].
"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].
Kilpatrick et al., "Securing the X Window System with SELinux," NAI Labs Report No. 03-006, 2003, 33 pages.
Stallman "GNU Operating System: Android and Users' Freedom," Sep. 2, 2013, 4 pages [gnu.org/philosophy/android-and-users-freedom.html].
Official Action for U.S. Appl. No. 13/399,929, mailed Dec. 3, 2013 21 pages.
Official Action for U.S. Appl. No. 13/399,936, mailed Sep. 10, 2013 23 pages.
Final Action for U.S. Appl. No. 13/217,099, mailed Oct. 9, 2013 74 pages.
Official Action for U.S. Appl. No. 13/217,108, mailed Oct. 11, 2013 13 pages.
Final Action for U.S. Appl. No. 13/251,427, mailed Oct. 21, 2013 17 pages.
Notice of Allowance for U.S. Appl. No. 13/247,166, mailed Nov. 4, 2013 14 pages.
Official Action for U.S. Appl. No. 13/217,130, mailed Sep. 16, 2013 12 pages.
Notice of Allowance for U.S. Appl. No. 13/246,669, mailed Sep. 11, 2013 16 pages.
Official Action for U.S. Appl. No. 13/246,671, mailed Nov. 20, 2013 50 pages.
Official Action for U.S. Appl. No. 13/246,675, mailed Sep. 27, 2013 32 pages.
Haselton, "Cello Announces Redfly Smart Phone Dock, Software for Windows PCs," Laptop Magazine, Jan. 8, 2009, [retrieved on Feb. 11, 2014], 4 pages. Retrieved from: blog.laptopmag.com/redfly-launches-smartphone-dock-software-for-windows-pcs.
Official Action for U.S. Appl. No. 13/399,936, mailed Feb. 20, 2014 27 pages.
Official Action for U.S. Appl. No. 13/246,665, mailed Feb. 27, 2014 38 pages.
Official Action for U.S. Appl. No. 13/217,108 mailed Feb. 25, 2014, 22 pages.
Official Action for U.S. Appl. No. 13/217,130, mailed Mar. 20, 2014 18 pages.
Notice of Allowance for U.S. Appl. No. 13/246,669, mailed Apr. 11, 2014 11 pages.
Official Action for U.S. Appl. No. 13/246,675, mailed Mar. 7, 2014 34 pages.

\* cited by examiner

MIRRORED REMOTE PERIPHERAL INTERFACE

BACKGROUND

As computers become smaller and more portable, it has become desirable to have increased ability to print to different printers from a portable computer or mobile telecommunications device. For example, with handheld computers approaching the size of a mobile phone, these computers and their users may often be in the vicinity of a printer that the user would like to print to. Unfortunately, most handheld devices have very little in the way of a user interface for the user to interact with a remote device such as a printer.

Further, the user oftentimes is acting under time pressures when operating the handheld device, such that using a cumbersome user interface for interacting with a remote device may not be desirable. In addition, such user interfaces are likely to be different than a user interface the user may customarily use on a desktop or laptop computer, such as when printing a document. It would be preferable if the user did not need to learn a different user interface for interacting with a remote device via a handheld computer. Also, printer setup and dialog boxes can impede the rapid printing of documents and they may difficult to use on the small display of a handheld device. Similarly, since it may be difficult to easily change default printer settings with the handheld device, it may make the handheld device less desirable to print from than a different device.

It is against this background that the present invention has been developed. The foregoing examples of the related art and limitations related therewith are intended to be illustrative and not exclusive. Other limitations of the related art will become apparent to those of skill in the art upon a reading of the specification and a study of the drawings.

SUMMARY

The mirrored remote peripheral interface includes a method implemented in a mobile telecommunication/computing device for interacting with a remote peripheral device, the mobile telecommunication/computing device including at least one sensor therein. The method includes determining an orientation or position of the mobile telecommunication/computing device by use of the sensor; and sending a command from the mobile telecommunication/computing device to the peripheral device for operation of the peripheral device, the command including information therein related to the orientation or position of the mobile telecommunication/computing device. The peripheral device can use the information to operate in a fashion in accordance with the orientation or position of the mobile telecommunication/computing device.

The remote peripheral device may be a printer and the orientation of the mobile telecommunication/computing device may be used to command the printer to print in one of portrait or landscape mode. The mobile telecommunication/computing device may include three orthogonal dimensions, a first dimension, a second dimension, and a third dimension, wherein the first dimension is longer than the second dimension and the second dimension is longer than the third dimension, and wherein the mobile telecommunication/computing device is rotated about an axis parallel to the third dimension to select the portrait or landscape orientation. The sensor in the mobile telecommunication/computing device includes an accelerometer.

The mirrored remote peripheral interface also includes a method for printing a document from a mobile telecommunication/computing device having a display thereon, the document being printed on a printer. The method includes displaying the document on the display in an orientation that corresponds to the physical orientation of the device; and sending information from the device to the printer, the information including information about the document to be printed and about the orientation in which the document is to be printed.

The method further includes receiving a command from a user to print the document. The method further includes printing the document on the printer in the orientation in which it was displayed on the device. The orientation of the document displayed on the device is one of portrait orientation and landscape orientation.

The mirrored remote peripheral interface also includes a mobile telecommunication/computing device that can print to a printer. The device includes a display that can be used to display a document stored on the device; a sensor that can determine orientational information about the physical orientation of the device; and a processor that receives the information and controls the orientation of the document being displayed on the display in accordance with the orientation of the device, the processor being further operative to control the sending of printing information including a representation of the document to the printer, wherein the printing information includes information to direct the printer to print in an orientation that corresponds to the orientation of the document being displayed on the display.

The orientation of the document displayed on the device is one of portrait orientation and landscape orientation. The sensor includes at least one accelerometer.

DETAILED DESCRIPTION

The following description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
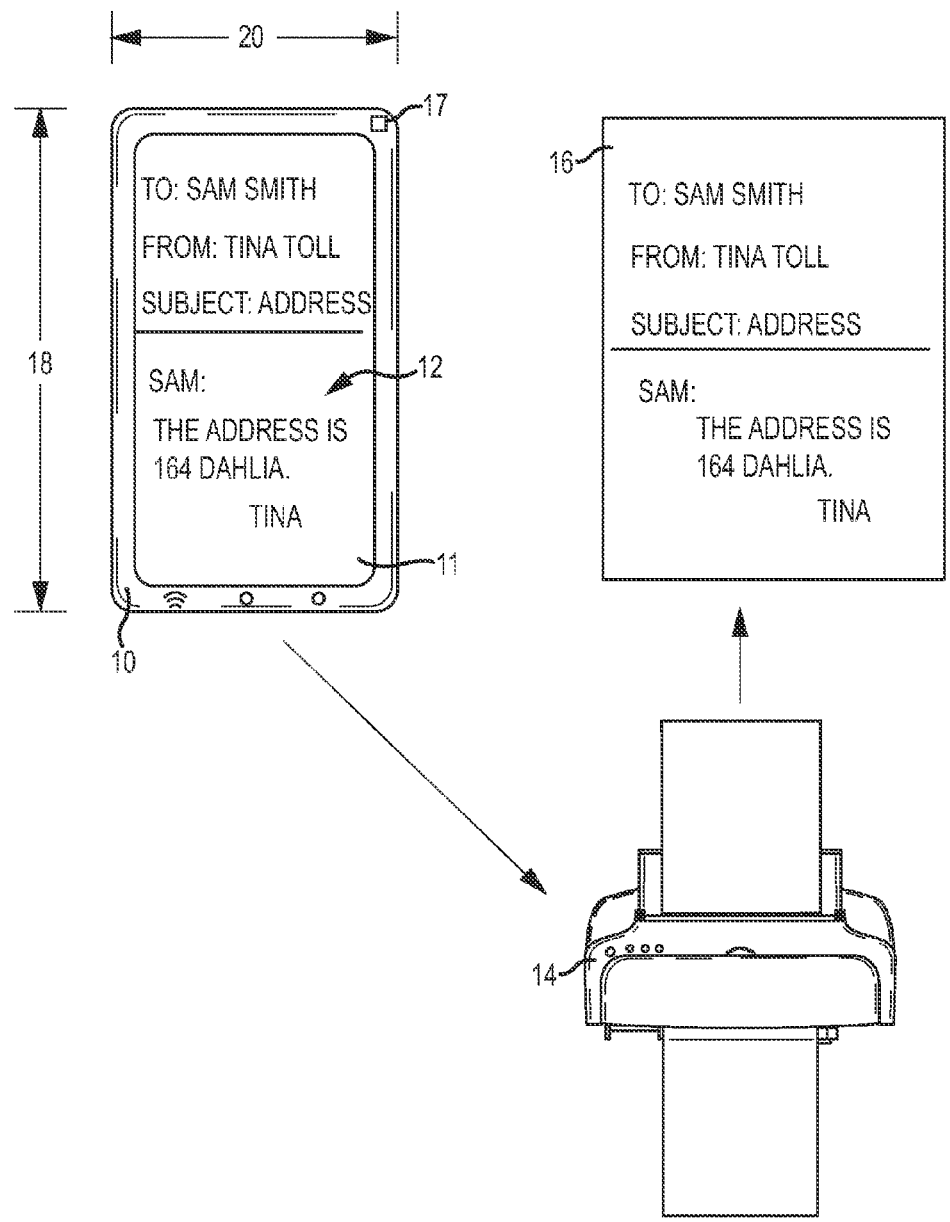
FIG. 1 is an illustration of a handheld device in an orientation where its longer axis is generally vertical and its shorter axis is generally horizontal, wherein a document sent to the printer generates the document printed in portrait mode.

As shown in FIG. 1, a handheld telecommunication device (such as a mobile phone or smart phone) or a handheld computing device (such as a smart phone, small tablet, or other handheld computer), collectively referred to as handheld device 10, can show on its display 11 an image 12 of a document to be printed (such as an email, a webpage, a photo, a document, a file, or most any other suitable image that can be displayed on a computer and which a user might want to print). The document to be printed is then sent by the device 10 to a printer 14 along with information instructing the printer 14 to print the document on a piece of paper 16 (or other suitable material) in one of portrait or landscape mode. As is well known in the art, the device 10 may have one or more sensors 17 therein (e.g., accelerometers) that can help the device 10 to determine its orientation or how it has been moved.

In the case of FIG. 1, the handheld device 10 is oriented with its longer dimension 18 extending in a generally vertical direction and its shorter dimension 20 extending in a generally horizontal direction. Since the display 11 on the device 10 generally has a similar aspect ratio to the aspect ratio of the device 10, the longer dimension of the display 11 also extends in a generally vertical direction. When the display 11 is displaying an image which is taller than it is wide, the display 11 and the image can be said to be in portrait mode. In this case, the information sent to the printer 14 commands the printer to print the document on the paper 16 in portrait mode. As can be seen in FIG. 1, when the email that is printed on the paper 16 is in portrait mode, the paper 16 will have its longer dimension generally vertical when the paper is held so that the lines of text in the printed email are generally horizontal and the text characters are generally oriented vertically (the conventional position for a document to be read).

Figure 2:
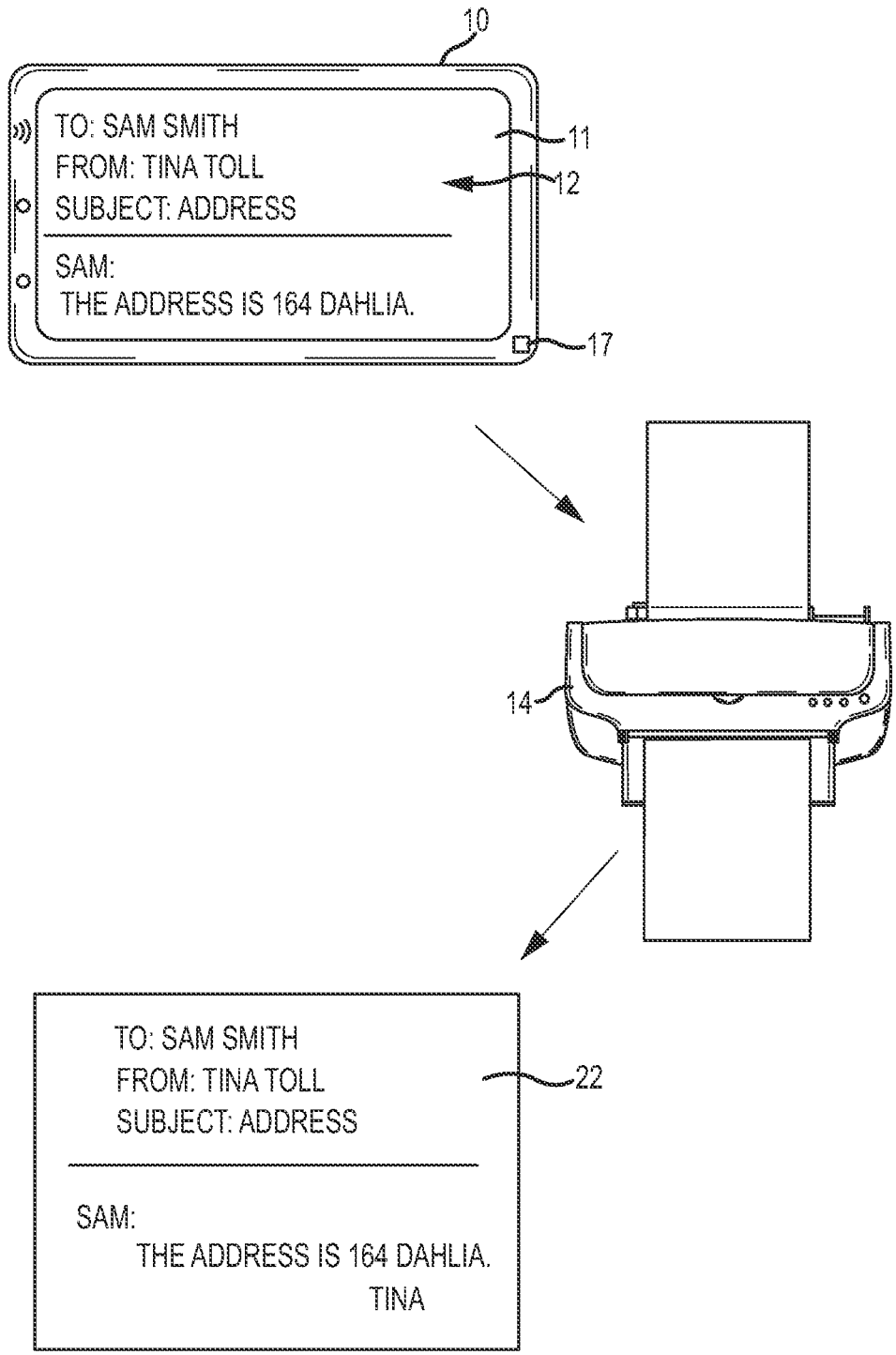
FIG. 2 is similar to FIG. 1 with the handheld device in a different orientation that results in the printer generating a document printed in landscape mode.

In FIG. 2, the device 10 has been rotated until its longer dimension is oriented generally horizontally. The sensors 17 help the device 10 to determine that it is now in this orientation. The device can then change how the image 12 is shown on the display so that the image is displayed in landscape mode in which the lines of text are generally parallel to the longer dimension of the device 10 (as contrasted with portrait mode where the lines of text are generally parallel to the shorter dimension of the device 10). If the user commands the device to print the document being displayed at the printer 14, the information passed to the printer instructs the printer to print the document on the paper 22 in landscape mode. As can be seen in FIG. 2, when the email that is printed on the paper 22 is in landscape mode, the paper 22 will have its longer dimension generally horizontal when the paper is held so that the lines of text in the printed email are generally horizontal and the text characters are generally oriented vertically (the conventional position for a document to be read).

As can be seen, the orientation of the device 10 is used to control the operation of a peripheral device (in this case the printer 14). Of course, the orientation of the device 10 could be used to control other operations of the printer 14 or operation of another type of peripheral device.

There are various methods by which the device 10 can pass information relating to the orientation (portrait or landscape) in which a document should be printed. One method may include the device 10 including a printer driver for the printer 14 on which the document is to be printed. In such case, the printer driver on the device 10 creates a print job that is then routed to the printer 14. The orientation information is used by the printer driver to create the print job differently based on the selected orientation. Another method may include the device 10 sending the document (rather than a print job) to the printer 14 or to an intermediate computer, either of which may create the print job. In such case, certain information may be provided by the user through a graphical user interface (GUI) on the device 10, such as number of copies to print, color versus black/white, print quality level, which pages of the document to print, and so forth. Alternatively, there may be default settings for these and other print characteristics, and the user would only need to use the printer control GUI in order to change one or more of the characteristics from the default setting. All of these print characteristics, plus the orientation information (portrait versus landscape) can be passed to the printer 14 or intermediate computer, where the print job is created. In the case where the other print characteristics have default settings and the orientation is determined by the orientation of the device 10, the user can print from the device 10 without having to otherwise control these aspects of printing such as through operation of a touch screen.

It is also possible that rotations other than the 90 degree rotations between portrait and landscape orientations could be used to control the printer or other peripheral device. For example, 180 degree, 270 degree, or 360 degree rotations (or greater) could also have different meanings. Further, rotations need not be in increments of 90 degrees. Such rotations might have different meanings. In addition, even as the selection of portrait or landscape mode for printing is described above, it is not a requirement that the device be oriented so that its longest axis is precisely vertical or horizontal, or even within five to ten degrees of same. The device 10 may be capable of determining whether the device is closer to being in landscape mode than portrait mode, such as when the longest axis is oriented in the range of 40 degrees from horizontal, for example. In such case, since the longest axis is closer to horizontal than to vertical, the device 10 may determine that it should display in landscape mode.

The device 10 may send the print job or document to the printer via any suitable means or combination of means, which may include Bluetooth, WiFi, 802.11, telephony, internet, cable (e.g., USB cable), or other. In addition to an intermediate computer, there may also or alternatively be a wireless router, other network communication device, or a local network.

Figure 3:
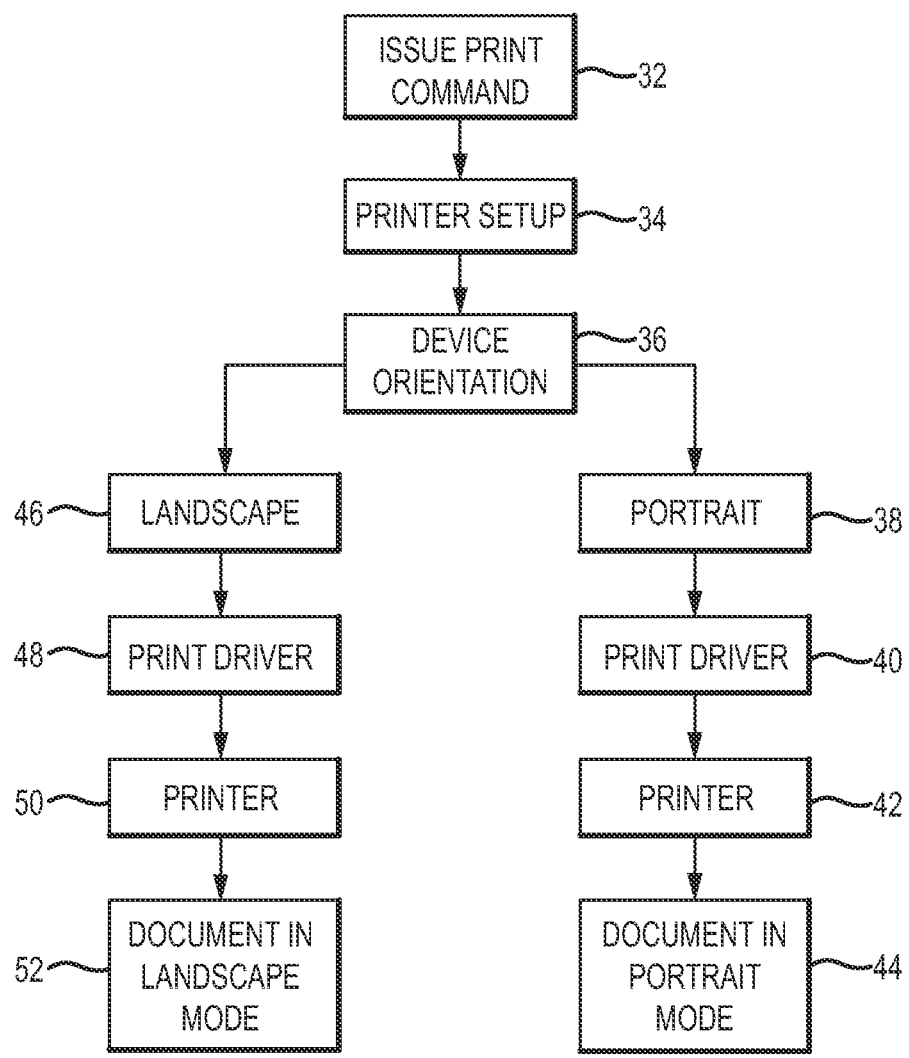
FIG. 3 is a flowchart of a process for printing a document.

A method 30 for printing from the device 10 to a printer 14 is shown in FIG. 3. The user generates (32) a print command (which may be done with any suitable method), a printer setup function (34) is then performed to gather the print characteristics for the print job. Part of this includes determining the current device orientation (36). If the device is in portrait orientation (38), the print driver (40) is provided that information and a print job is sent to the printer (42), where a document is printed on paper in portrait mode (44). On the other hand, if the device is in landscape orientation (46), the print driver (48) is provided that information and a print job is sent to the printer (50), where a document is printed on paper in landscape mode (52).

As discussed above, the position and orientation of the device 10 can be used to control other variables than the orientation of the print job. One example of such other variables may be related to three-dimensional printing, which is an additive manufacturing technology where a three-dimensional object is created by adding successive layers of material. In a situation where the handheld device 10 is being used to control a 3-D printing operation, translational movement of the device may be used to control the scale of the object to be printed. For example, movement of the device 10 away from the user could be a command to increase the scale of the object being created while movement of the device 10 toward the user could be a command to decrease the scale of the object being created. In addition, angular movement of the device around any of its three primary axes could change the orientation of the object being printed. For example, pivoting the device 10 around a vertical axis may change the "yaw" of the object as viewed on the printer, pivoting the device 10 around a horizontal axis (said axis being parallel to the display) may change the "pitch" of the object as viewed on the printer, and pivoting the device 10 around a horizontal axis (said axis being perpendicular to the display) may change the "roll" of the object as viewed on the printer This application incorporates by reference the entirety of U.S. patent application Ser. No. 12/905,887, entitled "Mobile Printing Framework," filed Oct. 15, 2010.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

The invention claimed is:

1. A method implemented in a mobile telecommunication/computing device for printing an electronic document on a paper document printer, the method comprising:
 providing the mobile telecommunication/computing device including at least one sensor, a print driver, a display configured to display an electronic document, and a means of directly communicating with the paper document printer therein, wherein the mobile telecommunication/computing device includes three orthogonal dimensions, a first dimension, a second dimension, and a third dimension, wherein the first dimension is longer than the second dimension and the second dimension is longer than the third dimension;
 displaying the electronic document on the display in an orientation that corresponds to a physical orientation of the mobile telecommunication/computing device;
 sensing the orientation of the mobile telecommunication/computing device by use of the at least one sensor;
 selecting the mobile telecommunication/computing device orientation as one of portrait and landscape based on a rotation of the mobile telecommunication/computing device about an axis parallel to the third dimension;
 assigning a print orientation identical to the selected mobile telecommunication/computing device orientation;
 generating a print instruction from the mobile telecommunication/computing device;
 assembling print characteristics;
 providing the print orientation to the print driver; and
 sending a print job command via the print driver from the mobile telecommunication/computing device directly to the paper document printer for controlling the operation of the paper document printer, the command including information therein related to the mobile telecommunication/computing device orientation, the print instruction, and the print characteristics;
 wherein the paper document printer, in response to the information, configures the orientation of a paper document to be printed based on the information related to the orientation of the mobile telecommunication/computing device, and, in response to the command, prints the paper document in the assigned print orientation.

2. The method as defined in claim 1, wherein if the at least one sensor determines that the mobile telecommunication/computing device is within 40 degrees from a horizontal the orientation is landscape mode.

3. The method as defined in claim 1, wherein if the longest dimension of the mobile telecommunication/computing device is closer to horizontal than vertical, the mobile telecommunication/computing device orientation is selected as landscape mode.

4. The method as defined in claim 2, wherein the sensor in the mobile telecommunication/computing device includes an accelerometer.

5. A method for printing a paper document from a mobile telecommunication/computing device having at least one sensor, a display and a means of directly communicating with a paper document printer thereon, the paper document being printed on a printer, the method comprising:
 providing the mobile telecommunication/computing device, wherein the mobile telecommunication/computing device further includes three orthogonal dimensions, a first dimension, a second dimension, and a third dimension, wherein the first dimension is longer than the second dimension and the second dimension is longer than the third dimension;
 displaying an electronic document on the display in an orientation that corresponds to a physical orientation of the mobile telecommunication/computing device;
 sensing the orientation of the mobile telecommunication/computing device by use of the at least one sensor, the mobile telecommunication/computing device orientation being one of landscape and portrait;
 generating a print instruction from the mobile telecommunication/computing device;
 sending a command directly to the printer to print the electronic document;
 sending information, with the command, from the mobile telecommunication/computing device directly to the printer, the information including information about the electronic document to be printed and about a printing orientation in which the electronic document is to be printed; and
 wherein the printer changes, in response to the information, the printing orientation of the paper document based on the orientation of the mobile telecommunication/computing device such that the printing orientation is the same as the mobile telecommunication/computing device orientation.

6. The method as defined in claim 5, further including receiving a command from a user to print the electronic document.

7. The method as defined in claim 5, wherein when a longest dimension of the mobile telecommunication/computing device is closer to horizontal than vertical, the mobile telecommunication/computing device orientation is selected as landscape.

8. The method as defined in claim 5, wherein the orientation of the electronic document displayed on the mobile telecommunication/computing device is one of portrait orientation and landscape orientation, wherein if the at least one sensor determines that the mobile telecommunication/computing device is within 40 degrees from a horizontal the orientation is landscape mode.

9. A mobile telecommunication/computing device that prints to a printer, comprising:
 a display that displays an electronic document stored on the mobile telecommunication/computing device;
 a sensor that determines orientation information about a physical orientation of the mobile telecommunication/computing device;
 a means of communicating with a paper document printer; and
 a processor that receives the orientation information and controls an orientation of the electronic document being displayed on the display in accordance with the orientation of the mobile telecommunication/computing device, the processor being further operative to:

change the orientation of the electronic document based on a change in the orientation information;

control the sending of printing information including a representation of the electronic document directly to the printer, wherein the representation of the electronic document is identical to the orientation of the mobile telecommunication/computing device; and wherein the printing information includes information to direct the printer to print a paper document in an orientation that is one of portrait and landscape mode.

10. The mobile telecommunication/computing device as defined in claim 9, wherein the mobile telecommunication/computing device includes three orthogonal dimensions, a first dimension, a second dimension, and a third dimension, wherein the first dimension is longer than the second dimension and the second dimension is longer than the third dimension; wherein when a longest dimension of the mobile telecommunication/computing device is closer to horizontal than vertical, the mobile telecommunication/computing device orientation is selected as landscape.

11. The mobile telecommunication/computing device as defined in claim 9, wherein the sensor includes at least one accelerometer.

12. The mobile telecommunication/computing device as defined in claim 9, further comprising a print driver.

* * * * *

UNITED STATES PATENT AND TRADEMARK OFFICE
CERTIFICATE OF CORRECTION

PATENT NO. : 8,761,831 B2
APPLICATION NO. : 12/905920
DATED : June 24, 2014
INVENTOR(S) : Reeves Page 1 of 1

It is certified that error appears in the above-identified patent and that said Letters Patent is hereby corrected as shown below:

In the Claims

Claim 9, column 6, lines 54-55, replace --that-prints-- with "that prints".

Signed and Sealed this
Second Day of December, 2014

Michelle K. Lee
*Deputy Director of the United States Patent and Trademark Office*